United States Patent
Hughes et al.

(10) Patent No.: US 12,428,586 B2
(45) Date of Patent: Sep. 30, 2025

(54) COMPOSITIONS CONTAINING TETRAFLUOROPROPENE, TETRAFLUOROETHANE AND PENTAFLUOROPROPENE AND USES THEREOF

(71) Applicant: THE CHEMOURS COMPANY FC, LLC, Wilmington, DE (US)

(72) Inventors: Joshua Hughes, Wilmington, DE (US); Luke David Simoni, Wilmington, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 77 days.

(21) Appl. No.: 18/686,515

(22) PCT Filed: Sep. 7, 2022

(86) PCT No.: PCT/US2022/042675
§ 371 (c)(1),
(2) Date: Feb. 26, 2024

(87) PCT Pub. No.: WO2023/038913
PCT Pub. Date: Mar. 16, 2023

(65) Prior Publication Data
US 2024/0368446 A1    Nov. 7, 2024

Related U.S. Application Data

(60) Provisional application No. 63/241,786, filed on Sep. 8, 2021.

(51) Int. Cl.
C09K 5/04 (2006.01)

(52) U.S. Cl.
CPC ........ *C09K 5/045* (2013.01); *C09K 2205/126* (2013.01); *C09K 2205/22* (2013.01); *C09K 2205/40* (2013.01)

(58) Field of Classification Search
CPC .............. C09K 5/045; C09K 2205/126; C09K 2205/22; C09K 2205/40;
(Continued)

(56) References Cited

U.S. PATENT DOCUMENTS

| | | | |
|---|---|---|---|
| 5,065,990 | A | 11/1991 | Durfee |
| 5,363,674 | A | 11/1994 | Powell |

(Continued)

FOREIGN PATENT DOCUMENTS

| | | | | |
|---|---|---|---|---|
| EP | 3699252 A1 | * | 8/2020 | .............. F25B 13/00 |
| WO | 2006094303 A2 | | 9/2006 | |
| WO | 2020180828 A1 | | 9/2020 | |

OTHER PUBLICATIONS

Intergovernmental Panel on Climate Change (IPCC), Climate Change 2007, The Physical Science Basis, 2007, pp. v-91, Cambridge University Press, 32 Avenue of the Americas, New York, NY 10013-2473.

(Continued)

*Primary Examiner* — Emmanuel E Duke (57) ABSTRACT

Disclosed herein are compositions for cooling and heating comprising refrigerant consisting essentially of HFO-1225yeE, HFO-1234zeE, and optionally HFC-134. These compositions are useful in methods for cooling and heating, in systems for cooling and heating, and in methods for replacing HFO-1234zeE, R-515A or R-515B. The inventive compositions provide non-flammable, low GWP refrigerants that can match performance of HFO-1234zeE.

22 Claims, 1 Drawing Sheet

(58) Field of Classification Search
CPC .... C10M 2207/2835; C10M 2209/043; C10M 2209/1033; C10M 171/008; C10N 2020/101; F25B 2400/121; F25B 1/00
See application file for complete search history.

(56) References Cited

U.S. PATENT DOCUMENTS

| | | | | |
|---|---|---|---|---|
| 2004/0127383 | A1* | 7/2004 | Pham | C07C 21/18 |
| | | | | 252/364 |
| 2006/0243945 | A1 | 11/2006 | Minor | |
| 2012/0126187 | A1* | 5/2012 | Low | C11D 7/5009 |
| | | | | 521/146 |
| 2019/0194096 | A1* | 6/2019 | Baker | C07F 1/08 |
| 2019/0308172 | A1* | 10/2019 | Zou | B01J 23/26 |
| 2020/0017743 | A1* | 1/2020 | Abbas | C09K 5/045 |
| 2020/0140357 | A1* | 5/2020 | Deur-Bert | B01J 19/02 |
| 2021/0198547 | A1* | 7/2021 | Ohkubo | C09K 5/04 |
| 2021/0301190 | A1* | 9/2021 | Abbas | C09K 5/045 |
| 2022/0195276 | A1* | 6/2022 | Peng | C10M 171/008 |

OTHER PUBLICATIONS

International Search Report and Written Opinion for International Application No. PCT/US2022/042675 (Chemours Reference No. FL2014-WO01) mailed Nov. 29, 2022.

Standard Test Method for Concentration Limits of Flammability of Chemicals (Vapors and Gases), ASTM International Designation E681-09, 2015, pp. 1-12, 100 Barr Harbor Drive, P. O. Box C700, West Conshohocken, PA 19428-2959.

* cited by examiner

COMPOSITIONS CONTAINING TETRAFLUOROPROPENE, TETRAFLUOROETHANE AND PENTAFLUOROPROPENE AND USES THEREOF

CROSS REFERENCE TO RELATED APPLICATIONS

This application is a national filing under 35 U.S.C. 371 of International Application No. PCT/US2022/042675 filed Sep. 7, 2022, and claims the benefit of priority of U.S. Provisional Application 63/241,786 filed Sep. 8, 2021 which are incorporated by reference herein in its entirety.

FIELD

The present invention is directed to refrigerant compositions and methods and systems using said compositions.

BACKGROUND

The refrigerants industry has been working to find replacement refrigerant for the ozone depleting chlorofluorocarbons (CFCs) and hydrochlorofluorocarbons (HCFCs) being phased out as a result of the Montreal Protocol. Hydrofluorocarbons (HFCs) have served that purpose for the past few decades. Now, due to new regulations related to global warming potential (GWP), the HFCs are also in need of replacement.

Hydrofluoroolefin 1,3,3,3-tetrafluoropropene (HFO-1234zeE) has a low GWP and is now being used in chillers and other medium pressure applications. But HFO-1234zeE is classified as a 2 L flammable refrigerant by the American Society of Heating, Refrigerating, and Air-Conditioning Engineers (ASHRAE). Therefore, there is a need for a non-flammable (class 1) refrigerant for those same applications.

SUMMARY

The present disclosure provides compositions comprising refrigerants consisting essentially of HFO-1225yeE, HFO-1234zeE, and optionally HFC-134. These compositions have been surprisingly found to provide non-flammable, low GWP refrigerants that can match the cooling capacity and COP of HFO-1234zeE alone.

The present invention includes the following aspects and embodiments:

In one aspect of the invention, the compositions comprise a refrigerant comprising from about 10 to 98 weight percent HFO-1225yeE, about 1 to 64 weight percent HFO-1234zeE, and about 1 to 27 weight percent HFC-134. In another aspect of the invention, the compositions include refrigerants comprising from about 23 to 98 weight percent HFO-1225yeE, about 1 to 64 weight percent HFO-1234zeE, and about 1 to 13 weight percent HFC-134. In another aspect of the invention, the compositions include refrigerants comprising from about 33 to 98 weight percent HFO-1225yeE, about 1 to 64 weight percent HFO-1234zeE, and about 1 to 4 weight percent HFC-134. In another aspect of the invention, the compositions include refrigerants comprising from about 10 to 78 weight percent HFO-1225yeE, about 11 to 64 weight percent HFO-1234zeE, and about 11 to 27 weight percent HFC-134. In another aspect of the invention, the compositions include refrigerants comprising from about 23 to 78 weight percent HFO-1225yeE, about 11 to 64 weight percent HFO-1234zeE, and about 11 to 13 weight percent HFC-134. In another aspect of the invention, the compositions include refrigerants comprising from about 10 to 78 weight percent HFO-1225yeE, about 11 to 64 weight percent HFO-1234zeE, and about 11 to 27 weight percent HFC-134. In another aspect of the invention, the compositions include refrigerants comprising from about 23 to 59 weight percent HFO-1225yeE, about 30 to 64 weight percent HFO-1234zeE, and about 11 to 13 weight percent HFC-134. In another aspect of the invention, the compositions include refrigerants comprising from about 23 to 59 weight percent HFO-1225yeE, about 12 to 64 weight percent HFO-1234zeE, and about 12 to 13 weight percent HFC-134. In another aspect of the invention, the compositions include refrigerants comprising from about 23 to 39 weight percent HFO-1225yeE, about 50 to 64 weight percent HFO-1234zeE, and about 11 to 13 weight percent HFC-134. In another aspect of the invention, the compositions include refrigerants comprising from about 23 to 39 weight percent HFO-1225yeE, about 12 to 64 weight percent HFO-1234zeE, and about 12 to 13 weight percent HFC-134. In another aspect of the invention, the compositions include a refrigerant consisting essentially of about 30 weight percent HFO-1225yeE, about 58 weight percent HFO-1234zeE, and about 12 weight percent HFC-134. In another aspect of the invention, the compositions include a refrigerant consisting essentially of about 26 weight percent HFO-1225yeE, about 62 weight percent HFO-1234zeE, and about 12 weight percent HFC-134.

In another aspect of the invention, the compositions comprise a refrigerant consisting essentially of greater than or equal to 36 weight percent HFO-1225yeE and less than or equal to 64 weight percent HFO-1234zeE. In another aspect of the invention, the compositions comprising refrigerants consisting essentially of from 36 to 39 weight percent HFO-1225yeE and from 61 to 64 weight percent HFO-1234zeE.

According to any of the foregoing embodiments, the compositions comprising a refrigerant consisting essentially of from about 36 to 40 weight percent HFO-1225yeE and from about 60 to 64 weight percent HFO-1234zeE.

According to any of the foregoing embodiments, compositions containing HFO-1234zeE and HFO-1225yeE will be classified as by ASHRAE as Class 1, non-flammable according to ASHRAE Standard 34 with 60 weight percent or less HFO-1234zeE and 40 weight percent or more HFO-1225yeE.

According to any of the foregoing embodiments, also disclosed herein are compositions comprising refrigerants that are non-flammable by ASTM E681.

According to any of the foregoing embodiments, also disclosed herein are compositions comprising refrigerants that have GWP less than 300, preferably less than 150.

According to any of the foregoing embodiments, also disclosed herein are compositions comprising refrigerants that have average temperature glide equal to or less than 0.25 K, preferably equal to or less than 0.15 K, more preferably equal to or less than 0.1 K.

According to any of the foregoing embodiments, also disclosed herein are compositions further comprising at least one lubricant.

According to any of the foregoing embodiments, also disclosed herein are compositions comprising refrigerants, wherein said lubricant is selected from the group consisting of polyalkylene glycol, polyol ester, and polyvinyl ether, and combinations thereof.

According to any of the foregoing embodiments, also disclosed herein are compositions further comprising from 0.1 to 200 ppm by weight of water.

According to any of the foregoing embodiments, also disclosed herein are compositions further comprising from about 10 ppm by volume to about 0.35 volume percent oxygen.

According to any of the foregoing embodiments, also disclosed herein are compositions further comprising from about 100 ppm by volume to about 1.5 volume percent air.

According to any of the foregoing embodiments, also disclosed herein are compositions comprising refrigerants further comprising at least one stabilizer.

According to any of the foregoing embodiments, also disclosed herein are compositions comprising refrigerants wherein said stabilizer is selected from the group consisting of nitromethane, ascorbic acid, terephthalic acid, azoles, phenolic compounds, cyclic monoterpenes, terpenes, phosphites, phosphates, phosphonates, thiols, lactones, and combinations thereof.

According to any of the foregoing embodiments, also disclosed herein are compositions comprising refrigerants said stabilizer is selected from the group consisting of tolutriazole, benzotriazole, tocopherol, hydroquinone, t-butyl hydroquinone, 2,6-di-terbutyl-4-methylphenol, fluorinated epoxides, n-butyl glycidyl ether, hexanediol diglycidyl ether, allyl glycidyl ether, butylphenylglycidyl ether, d-limonene, α-terpinene, β-terpinene, γ-terpinene, α-pinene, β-pinene, butylated hydroxytoluene, and combinations thereof.

According to any of the foregoing embodiments, also disclosed herein are compositions comprising refrigerants further comprising at least one tracer.

According to any of the foregoing embodiments, also disclosed herein are compositions comprising refrigerants, wherein said tracer is selected from hydrofluorocarbons, hydrofluoroolefins, hydrochlorocarbons, hydrochloroolefins, hydrochlorofluorocarbons, hydrochlorofluoroolefins, hydrochlorocarbons, hydrochloroolefins, chlorofluorocarbons, chlorofluoroolefins, hydrocarbons, perfluorocarbons, perfluoroolefins, and combinations thereof.

According to any of the foregoing embodiments, also disclosed herein are compositions comprising refrigerants wherein said tracer is selected from HFC-23, HCFC-31, HFC-41, HFC-161, HFC-152a, HFC-143a, HFC-125, HFC-227ca, HFC-227ea, HFC-236fa, HFC-236cb, HFC-236ea, HFC-245cb, HFC-245fa, HFC-245eb, HFC-254eb, HFC-263fb, HFC-272ca, HFC-281ea, HFC-281fa, HFC-329p, HFC-329mmz, HFC338mf, HFC-338pcc, CFC-12, CFC-11, CFC-114, CFC-114a, HCFC-22, HCFC-123, HCFC-124, HCFC-124a, HCFC-141b, HCFC-142b, HCFC-151a, HCFC-244bb, HCC-40, HFO-1141, HCFO-1130, HCFO-1130a, HCFO-1131, HCFO-1122, HFO-1123, HFO-1234ye, HFO-1243zf, HFO-1225yeZ, HFO-1225zc, PFC-116, PFC-C216, PFC-218, PFC-C318, PFC-1216, PFC-31-10mc, PFC-31-10my, and combinations thereof.

In another embodiment, disclosed herein is a refrigerant storage container containing the compositions according to any of the foregoing embodiments, wherein the refrigerant comprises gaseous and liquid phases.

In another embodiment, disclosed herein is a process for producing cooling comprising evaporating the compositions according to any of the foregoing embodiments in the vicinity of a body to be cooled and thereafter condensing said composition.

In another embodiment, disclosed herein is a process for producing heating comprising condensing the compositions according to any of the foregoing embodiments in the vicinity of a body to be heated and thereafter evaporating said composition.

In another embodiment, disclosed herein is a system for cooling comprising an evaporator, compressor, condenser, and expansion device, said system containing the compositions of any of the foregoing embodiments.

In another embodiment, the system for cooling and/or heating is a chiller. In another embodiment, the system for cooling and/or heating is a direct expansion or flooded evaporator chiller. In another embodiment, the system for cooling and/or heating includes a compressor selected from a centrifugal, screw, scroll or reciprocating compressor. In another embodiment, the system for cooling and/or heating includes a centrifugal compressor. In another embodiment, the system for cooling and/or heating includes a screw compressor. In another embodiment, the system for cooling and/or heating includes a scroll compressor. In another embodiment, the system for cooling and/or heating includes a reciprocating compressor.

In another embodiment, system for heating comprising an evaporator, compressor, condenser, and expansion device, said system containing the composition according to any of the foregoing embodiments. In another embodiment, the system for cooling and heating is a heat pump. In another embodiment the system is a high temperature heat pump. In another embodiment, the system is a water heating heat pump. In another embodiment, the system is an air heating heat pump.

In another embodiment, disclosed herein is a method for replacing HFO-1234zeE in a system for cooling or heating comprising providing the composition of any of the foregoing embodiments to the system. In another embodiment, the method is replacing HFO-1234zeE in a chiller. In another embodiment, the method is replacing HFO-1234zeE in a heat pump. In another embodiment, the method is replacing HFO-1234zeE in a water heating heat pump. In another embodiment, the method is replacing HFO-1234zeE in an air heating heat pump. In another embodiment the method is replacing HFO-1234ze in a high temperature heat pump.

In another embodiment, disclosed herein is a method for replacing HFO-1234zeE or R-515A or R-515B in a system for cooling or heating comprising providing the composition of any of the foregoing embodiments to said system, wherein the system comprises a centrifugal compressor.

In another embodiment, disclosed herein is a method for replacing HFO-1234zeE or R-515A or R-515B in a system for cooling or heating comprising providing the composition of any of the foregoing embodiments to said system, wherein the system comprises a centrifugal compressor, and wherein said composition provides tip speed within 5% or preferably within 2% of that for HFO-1234zeE or R-515A or R-515B.

DETAILED DESCRIPTION

Definitions

As used herein, the term heat transfer fluid (also referred to as heat transfer medium) means a composition used to carry heat from a heat source to a heat sink.

A heat source is defined as any space, location, object, or body from which it is desirable to add, transfer, move or remove heat. Examples of heat sources are spaces (open or enclosed) requiring refrigeration or cooling, such as refrigerator or freezer cases in a supermarket, transport refrigerated containers, building spaces requiring air conditioning, industrial water chillers or the passenger compartment of an automobile requiring air conditioning. In some embodiments, the heat transfer composition may remain in a constant state throughout the transfer process (i.e., not evaporate or condense). In other embodiments, evaporative cooling processes may utilize heat transfer compositions as well.

A heat sink is defined as any space, location, object, or body capable of absorbing heat. A vapor compression refrigeration system is one example of such a heat sink.

A refrigerant is defined as a heat transfer fluid that undergoes a phase change from liquid to gas and back again during a cycle used to transfer of heat.

A heat transfer system is the system (or apparatus) used to produce a heating or cooling effect in a particular space. A heat transfer system may be a mobile system or a stationary system.

Examples of heat transfer systems are any type of refrigeration systems and air conditioning systems including, but are not limited to, stationary heat transfer systems, air conditioners, freezers, refrigerators, heat pumps, high temperature heat pumps, water heating heat pumps, chillers, water chillers, flooded evaporator chillers, direct expansion chillers, walk-in coolers, mobile refrigerators, mobile heat transfer systems, mobile air conditioning units, dehumidifiers, and combinations thereof.

Refrigeration capacity (also referred to as cooling capacity) is a term which defines the change in enthalpy of a refrigerant in an evaporator per pound of refrigerant circulated, or the heat removed by the refrigerant in the evaporator per unit volume of refrigerant vapor exiting the evaporator (volumetric capacity). The refrigeration capacity is a measure of the ability of a refrigerant or heat transfer composition to produce cooling. Therefore, the higher the capacity, the greater the cooling that is produced. Cooling rate refers to the heat removed by the refrigerant in the evaporator per unit time.

Coefficient of performance (COP) is the amount of heat removed divided by the required energy input to operate the cycle. The higher the COP, the higher is the energy efficiency. COP is directly related to the energy efficiency ratio (EER) that is the efficiency rating for refrigeration or air conditioning equipment at a specific set of internal and external temperatures.

The term "subcooling" refers to the reduction of the temperature of a liquid below that liquid's saturation point for a given pressure. The saturation point is the temperature at which the vapor is completely condensed to a liquid, but subcooling continues to cool the liquid to a lower temperature liquid at the given pressure. By cooling a liquid below the saturation temperature (or bubble point temperature), the net refrigeration capacity can be increased. Subcooling thereby improves refrigeration capacity and energy efficiency of a system. Subcool amount is the amount of cooling below the saturation temperature (in degrees).

Superheat is a term that defines how far above its saturation vapor temperature (the temperature at which, if the composition is cooled, the first drop of liquid is formed, also referred to as the "dew point") a vapor composition is heated.

Temperature glide (sometimes referred to simply as "glide") is the absolute value of the difference between the starting and ending temperatures of a phase-change process by a refrigerant within a component of a refrigerant system, exclusive of any subcooling or superheating. This term may be used to describe condensation or evaporation of a near azeotrope or non-azeotropic composition. When referring to the temperature glide of a refrigeration, air conditioning or heat pump system, it is common to provide the average temperature glide being the average of the temperature glide in the evaporator and the temperature glide in the condenser.

The net refrigeration effect is the quantity of heat that each kilogram of refrigerant absorbs in the evaporator to produce useful cooling.

The mass flow rate is the quantity of refrigerant in kilograms circulating through the refrigeration, heat pump or air conditioning system over a given period of time.

As used herein, the term "lubricant" means any material added to a composition or a compressor (and in contact with any heat transfer composition in use within any heat transfer system) that provides lubrication to the compressor to aid in preventing parts from seizing.

Flammability is a term used to mean the ability of a composition to ignite and/or propagate a flame. For refrigerants and other heat transfer compositions, the lower flammability limit ("LFL") is the minimum concentration of the heat transfer composition in air that is capable of propagating a flame through a homogeneous mixture of the composition and air under test conditions specified in ASTM (American Society of Testing and Materials) E681. The upper flammability limit ("UFL") is the maximum concentration of the heat transfer composition in air that is capable of propagating a flame through a homogeneous mixture of the composition and air under the same test conditions. Determination of whether a refrigerant compound or mixture is flammable, or non-flammable is also done by testing under the conditions of ASTM E-681.

During a refrigerant leak, lower boiling components of a mixture may leak preferentially. Thus, the composition in the system, as well as the vapor leaking can vary over the time period of the leak. Thus, a non-flammable mixture may become flammable under leakage scenarios. And in order to be classified as non-flammable by ASHRAE (American Society of Heating, Refrigeration and Air-conditioning Engineers), a refrigerant or heat transfer composition must be non-flammable as formulated, but also under leakage conditions.

Global warming potential (GWP) is an index for estimating relative global warming contribution due to atmospheric emission of a kilogram of a particular greenhouse gas compared to emission of a kilogram of carbon dioxide. GWP can be calculated for different time horizons showing the effect of atmospheric lifetime for a given gas. The GWP for the 100-year time horizon is commonly the value referenced. For mixtures, a weighted average can be calculated based on the individual GWPs for each component.

Ozone depletion potential (ODP) is a number that refers to the amount of ozone depletion caused by a substance. The ODP is the ratio of the impact on ozone of a chemical compared to the impact of a similar mass of CFC-11

(fluorotrichloromethane). Thus, the ODP of CFC-11 is defined to be 1.0. Other CFCs and HCFCs have ODPs that range from 0.01 to 1.0. HFCs and HFOs have zero ODP because they do not contain chlorine or other ozone depleting halogens.

As used herein, the terms "comprises," "comprising," "includes," "including," "has," "having" or any other variation thereof, are intended to cover a non-exclusive inclusion. For example, a composition, process, method, article, or apparatus that comprises a list of elements is not necessarily limited to only those elements but may include other elements not expressly listed or inherent to such composition, process, method, article, or apparatus.

The transitional phrase "consisting of" excludes any element, step, or ingredient not specified. If in the claim such would close the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" is used to define a composition, method or apparatus that includes materials, steps, features, components, or elements, in addition to those literally disclosed provided that these additional included materials, steps, features, components, or elements do not materially affect the basic and novel characteristic(s) of the claimed invention. The term 'consisting essentially of' occupies a middle ground between "comprising" and 'consisting of'. Typically, components of the refrigerant mixtures and the refrigerant mixtures themselves can contain minor amounts (e.g., less than about 0.5 weight percent total) of impurities and/or byproducts (e.g., from the manufacture of the refrigerant components or reclamation of the refrigerant components from other systems) which do not materially affect the novel and basic characteristics of the refrigerant mixture.

Where applicants have defined an invention or a portion thereof with an open-ended term such as "comprising," it should be readily understood that (unless otherwise stated) the description should be interpreted to also describe such an invention using the terms "consisting essentially of" or "consisting of."

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the disclosed compositions, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

Compositions

The present inventors have discovered refrigerant compositions that provide non-flammable, low GWP refrigerants with cooling and heating performance matching or similar to HFO-1234zeE. The compositions comprise refrigerants comprising of HFO-1225yeE (E-1,2,3,3,3-pentafluoropropene), HFO-1234zeE (E-1,3,3,3-tetrafluoropropene), and optionally HFC-134 (1,1,2,2-tetrafluoroethane). Alternatively, the compositions may consist essentially of HFO-1225yeE, HFO-1234zeE, and optionally HFC-134.

HFO-1225yeE may be made by methods known in the art, such as by dehydrofluorination of HFC-236ea (1,1,1,2,3,3-hexafluoropropane) as described in WO2008/030439, incorporated herein by reference. HFO-1225yeE may also be available from specialty fluorochemical manufacturers, including, for instance, Synquest Laboratories, Inc. (Alachua, FL, USA).

HFO-1234zeE may be made by methods known in the art, such as by contacting 1,1,1,3,3-pentafluoropropane (HFC-245fa) in the vapor phase with a chromium-based catalyst at elevated temperature, or in the liquid phase with an alcoholic solution of KOH, NaOH, $Ca(OH)_2$ or $Mg(OH)_2$, as described in EP 974,571, also incorporated herein by reference. HFO-1234zeE is also available commercially.

HFC-134 may be made by methods known in the art, such as by hydrogenation of 1,2-dichloro-1,1,2,2-tetrafluoroethane (CFC-114).

In one embodiment, the compositions comprise refrigerants consisting essentially of HFO-1225yeE and HFO-1234zeE. Addition of HFO-1225yeE to HFO-1234zeE provides a refrigerant with reduced flammability as compared to HFO-1234zeE alone. Many applications in the industry prefer or require non-flammable refrigerants. The compositions comprising non-flammable refrigerants consist essentially of greater than or equal to about 35.5 weight percent HFO-1225yeE (greater than about 35.5 weight percent to about 99 weight percent HFO-1225yeE) are non-flammable by ASTM E-681. In one embodiment, the compositions are non-flammable at 60° C. In another embodiment, the compositions are non-flammable at 100° C.

In a preferred embodiment, the compositions are classified by American Society of Heating, Refrigeration and Air-Conditioning Engineers (ASHRAE) as Class 1, non-flammable according to ASHRAE Standard 34.

In another embodiment, the compositions containing HFO-1225yeE and HFC-1234zeE have ultra-low GWP, meaning less than 10, or less than 5.

In another embodiment, the compositions containing HFO-1225yeE and HFC-1234zeE provide volumetric capacity similar to HFO-1234zeE alone under the same conditions for operation. In one embodiment, the compositions disclosed herein provide volumetric capacity within 10% of that for HFO-1234zeE alone under the same conditions. In another embodiment, the compositions disclosed herein provide volumetric capacity within 8% of that for HFO-1234zeE alone under the same conditions. In a preferred embodiment, the compositions disclosed herein provide volumetric capacity within 5% of that for HFO-1234zeE alone under the same conditions.

In another embodiment, the compositions containing HFO-1225yeE and HFC-1234zeE as disclosed herein provide average temperature glides less than 0.5 K over the operating range of interest, or alternatively, less than 0.1 K over the operating range of interest. For some applications, such as flooded evaporator chillers, very low temperature glide is needed to ensure proper performance.

The present disclosure also provides compositions comprising refrigerants comprising HFO-1225yeE, HFC-1234zeE, and HFC-134. Alternatively, the present disclosure provides compositions comprising refrigerants consisting essentially of HFO-1225yeE, HFC-1234zeE, and HFC-134. In one embodiment, the compositions comprise a refrigerant comprising from about 10 to 98 weight percent HFO-1225yeE, about 1 to 64 weight percent HFO-1234zeE, and about 1 to 27 weight percent HFC-134. In another embodiment, the compositions include refrigerants comprising from about 23 to 98 weight percent HFO-1225yeE, about 1 to 64 weight percent HFO-1234zeE, and about 1 to 13 weight percent HFC-134. In another embodiment, the compositions include refrigerants comprising from about 33 to 98 weight percent HFO-1225yeE, about 1 to 64 weight percent HFO-1234zeE, and about 1 to 4 weight percent HFC-134. In another embodiment, the compositions include refrigerants comprising from about 10 to 78 weight percent HFO-1225yeE, about 11 to 64 weight percent HFO-1234zeE, and about 11 to 27 weight percent HFC-134. In another embodiment, the compositions include refrigerants comprising from about 23 to 78 weight percent HFO-1225yeE, about 11 to 64 weight percent HFO-1234zeE, and about 11 to 13 weight percent HFC-134. In another embodiment, the compositions include refrigerants comprising from about 10 to 78 weight percent HFO-1225yeE, about 11 to 64 weight percent HFO-1234zeE, and about 11 to 27 weight percent HFC-134. In another embodiment, the compositions include refrigerants comprising from about 23 to 59 weight percent HFO-1225yeE, about 30 to 64 weight percent HFO-1234zeE, and about 11 to 13 weight percent HFC-134. In another embodiment, the compositions include refrigerants comprising from about 23 to 59 weight percent HFO-1225yeE, about 12 to 64 weight percent HFO-1234zeE, and about 12 to 13 weight percent HFC-134. In another embodiment, the compositions include refrigerants comprising from about 23 to 39 weight percent HFO-1225yeE, about 50 to 64 weight percent HFO-1234zeE, and about 11 to 13 weight percent HFC-134. In another embodiment, the compositions include refrigerants comprising from about 23 to 39 weight percent HFO-1225yeE, about 12 to 64 weight percent HFO-1234zeE, and about 12 to 13 weight percent HFC-134. In another embodiment, the compositions include a refrigerant consisting essentially of about 30 weight percent HFO-1225yeE, about 58 weight percent HFO-1234zeE, and about 12 weight percent HFC-134

In another embodiment, the compositions comprise a refrigerant consisting essentially of greater than or equal to 36 weight percent HFO-1225yeE and less than or equal to 64 weight percent HFO-1234zeE. In another embodiment, the compositions comprising refrigerants consisting essentially of from 36 to 39 weight percent HFO-1225yeE and from 61 to 64 weight percent HFO-1234zeE. These binary compositions are non-flammable according to ASTM E681. In another embodiment, these binary compositions have GWP less than or equal to 10, or preferably GWP less than or equal to 5.

The addition of HFC-134 to the refrigerants of the present compositions provides both increased capacity and further flammability suppression. In one embodiment, the compositions comprising refrigerants consisting essentially of HFO-1225yeE, HFC-1234zeE, and HFC-134 may be non-flammable according to ASTM E681. In another embodiment, the refrigerants disclosed herein are non-flammable at 60° C. In another embodiment, these refrigerants are non-flammable at 100° C.

Figure 1:
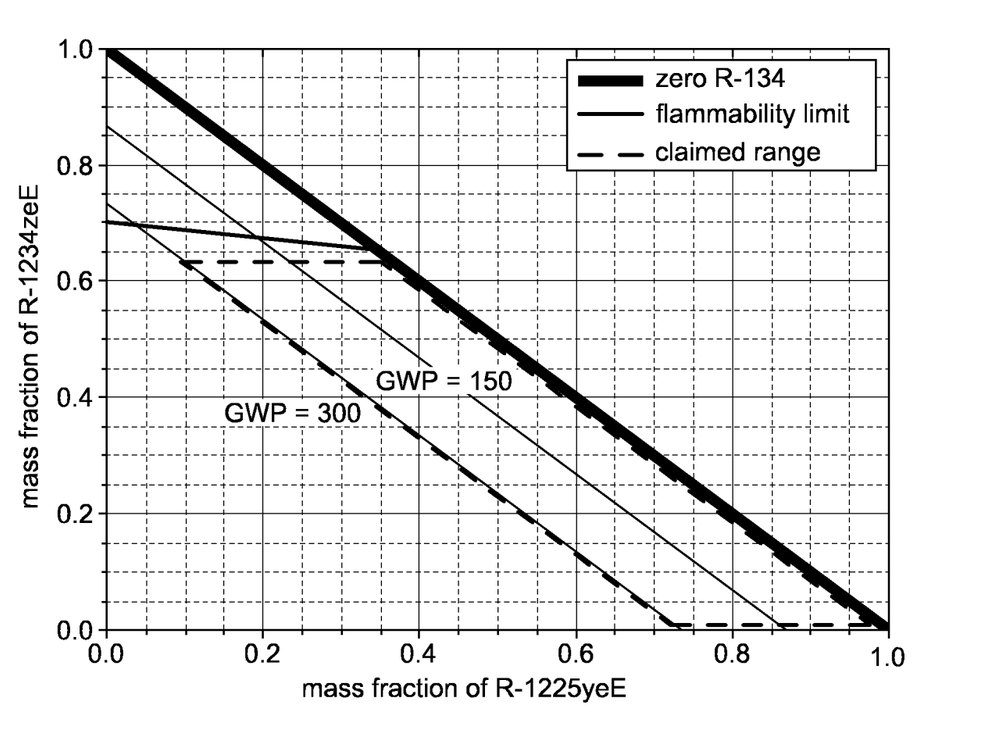
FIG. 1 illustrates the flammability boundary for compositions containing HFO-1225yeE, HFO-1234zeE, and HFC-134.

With reference to FIG. 1, the compositions comprising non-flammable refrigerants consist essentially of those compositions on the non-flammable side of the flammability boundary in the diagram of ternary compositions. The boundary was determined by measurement of the flammability of binary mixtures of HFO-1234zeE and HFO-1225yeE, as well as the binary mixtures of HFO-1234ze and HFC-134 (see Example 1). It was found that compositions containing HFO-1234zeE and HFO-1225yeE will be non-flammable with less than or equal to 64.5 weight percent (e.g., 64 wt %) HFO-1234zeE (and greater than or equal to 35.5 weight percent (e.g., 36 wt %) HFO-1225yeE).

In a preferred embodiment, the refrigerants consisting essentially of HFO-1225yeE, HFC-1234zeE, and HFC-134 are classified by American Society of Heating, Refrigeration and Air-Conditioning Engineers (ASHRAE) as Class 1, non-flammable according to ASHRAE Standard 34. This means that not only is the nominal formulation non-flammable, but the compositions created during a leakage situation also remain non-flammable.

In a further embodiment, it has been found that compositions containing HFO-1234zeE and HFO-1225yeE will be classified as by ASHRAE as Class 1, non-flammable according to ASHRAE Standard 34 with 60 weight percent or less HFO-1234zeE and 40 weight percent or more HFO-1225yeE.

In another embodiment, the refrigerants containing HFO-1225yeE, HFC-1234zeE, and HFC-134 have low GWP. In one embodiment, the refrigerants have GWP less than 300, or preferably GWP less than 150.

In another embodiment, the compositions containing HFO-1225yeE, HFC-1234zeE, and optionally HFC-134 provide volumetric capacity similar to HFO-1234zeE alone under the same conditions for operation. In one embodiment, the compositions disclosed herein provide volumetric capacity within 10% of that for HFO-1234zeE alone under the same conditions. In another embodiment, the compositions disclosed herein provide volumetric capacity within 5% of that for HFO-1234zeE alone under the same conditions. In a preferred embodiment, the compositions disclosed herein provide volumetric capacity within 2% of that for HFO-1234zeE alone under the same conditions.

In another embodiment, the compositions containing HFO-1225yeE, HFO-1234zeE, and HFC-134 as disclosed herein provide average temperature glides less than 0.5 K over the operating range of interest, or alternatively, less than 0.25 K over the operating range of interest, or preferably less than 0.15 K over the operating area of interest. For some applications, such as flooded evaporator chillers, very low temperature glide is needed to ensure proper performance.

In addition to refrigerants the compositions of the present invention may contain other additional compounds. These additional compounds may be selected from lubricants, stabilizers, tracers, UV dyes, among others.

In one embodiment, the compositions as disclosed herein containing refrigerants comprising HFO-1225yeE, HFO-1234zeE, and optionally HFC-134 may further comprise at least one refrigeration lubricant. In one embodiment, the at least one lubricant is selected from the group consisting of polyalkylene glycol (PAG), polyol ester (POE), and polyvinyl ether (PVE) and combinations thereof. Additionally, other lubricants may be included in the present compositions, such as mineral oils, alkylbenzenes, polyalphaolefins, among others. The amount of lubricant included in the present compositions may vary across a wide range. Once a refrigerant is charged into a system for cooling or heating, there will be varying amounts of lubricant mixed with the refrigerants, depending on the location in the system. In one embodiment, the lubricant comprises POE. In another embodiment, the lubricant comprises PVE. In another embodiment, the lubricant comprises PAG.

The lubricants disclosed herein for combination with the present inventive compositions have volume resistivity of greater than $10^{10}$ Ω-m at 20° C.; surface tension of from about 0.02 N/m to 0.04 N/m at 20° C.; a kinematic viscosity of from about 20 cSt to about 500 cSt at 40° C.; a breakdown voltage of at least 25 kV; and a hydroxy value of at most 0.1 mg KOH/g.

In another embodiment, stabilizer may be added to the refrigerants containing HFO-1225yeE, HFO-1234zeE, and optionally HFC-134. Stabilizers serve to inhibit breakdown of the refrigerant molecules due to the presence of water or oxygen in the system. Additionally, stabilizers may prevent polymerization of the HFO components of the refrigerant mixtures. Thus, provided herein are compositions comprising refrigerants comprising or consisting essentially of HFO-1225yeE, HFO-1234zeE, and optionally HFC-134 further comprising at least one stabilizer. In one embodiment, the at least one stabilizer may be selected from nitromethane, ascorbic acid, terephthalic acid, azoles, phenolic compounds, cyclic monoterpenes, terpenes, phosphites, phosphates, phosphonates, thiols, lactones, and combinations thereof. In another embodiment, the stabilizer is selected from the group consisting of tolutriazole, benzotriazole, tocopherol, hydroquinone, t-butyl hydroquinone, 2,6-di-ter-butyl-4-methylphenol, fluorinated epoxides, n-butyl glycidyl ether, hexanediol diglycidyl ether, allyl glycidyl ether, butylphenylglycidyl ether, d-limonene, α-terpinene, β-ter-pinene, γ-terpinene, α-pinene, β-pinene, butylated hydroxytoluene, and combinations thereof.

Alternatively, the stabilizers comprised in the inventive compositions may be selected from the group consisting of hindered phenols, thiophosphates, butylated triphenylphosphorothionates, organo phosphates, or phosphites, aryl alkyl ethers, terpenes, terpenoids, epoxides, fluorinated epoxides, oxetanes, ascorbic acid, thiols, lactones, thioethers, amines, nitromethane, alkylsilanes, benzophenone derivatives, aryl sulfides, divinyl terephthalic acid, diphenyl terephthalic acid, ionic liquids, and mixtures thereof.

Additionally, the present compositions may further comprise at least one tracer compound or mixture of tracer compounds. Tracers may be used to identify the process by which a refrigerant, or refrigerant mixture is produced. The tracer compounds may be specific to the manner of production or may be added as a single tracer or mixture of tracers in particular amounts in order to detect dilution, adulteration, contamination, or other unauthorized practices.

The tracer may be a single compound or two or more tracer compounds from the same class of compounds or from different classes of compounds. In some embodiments, the tracer is present in the compositions at a total concentration of about 1 part per million by weight (ppm) to about 5000 ppm, based on the weight of the total composition. In other embodiments, the tracer is present at a total concentration of about 1 ppm to about 1000 ppm. In other embodiments, the tracer is present at a total concentration of about 2 ppm to about 500 ppm. Alternatively, the tracer is present at a total concentration of about 10 ppm to about 300 ppm.

The tracer compound or compounds may be selected from hydrofluorocarbons, hydrofluoroolefins, hydrochlorocarbons, hydrochloroolefins, hydrochlorofluorocarbons, hydrochlorofluoroolefins, hydrochlorocarbons, hydrochloroolefins, chlorofluorocarbons, chlorofluoroolefins, hydrocarbons, perfluorocarbons, perfluoroolefins, and combinations thereof. In particular, the tracers may include, but are not limited to compounds selected from HFC-23 (trifluoromethane), HCFC-31 (chlorofluoromethane), HFC-41 (fluoromethane), HFC-161 (fluoroethane), HFC-152a (1,1-difluoromethane), HFC-143a (1,1,1-trifluoroethane), HFC-125 (pentafluoroethane), HFC-227ca (1,1,1,2,2,3,3-heptafluoropropane), HFC-227ea (1,1,1,2,3,3,3-heptafluoropropane), HFC-236fa (1,1,1,3,3,3-hexafluoropropane), HFC-236cb (1,1,1,2,2,3-hexafluoropropane), HFC-236ea (1,1,1,2,3,3-hexafluoropropane), HFC-245cb (1,1,1,2,2-pentafluoropropane), HFC-245fa (1,1,1,3,3-pentafluoropropane) HFC-245eb (1,1,1,2,3-pentafluoropropane), HFC-254eb (1,1,1,2-tetrafluoropropane), HFC-263fb (1,1,1-trifluoropropane), HFC-272ca (2,2-difluoropropane), HFC-281ea (2-fluoropropane), HFC-281fa (1-fluoropropane), HFC-329p (1,1,1,2,2,3,3,4,4-nonafluorobutane), HFC-329mmz (2-trifluoromethyl-1,1,1,3,3,3-hexafluoropropane), HFC-338mf (1,1,1,2,2,4,4,4-octafluorobutane), HFC-338pcc (1,1,2,2,3,3,4,4-octafluorobutane), CFC-12 (dichlorodifluoromethane), CFC-11 (trichlorofluoromethane), CFC-114 (1,2-dichloro-1,1,2,2-tetrafluoroethane), CFC-114a (2,2-dichloro-1,1,1,2-tetrafluoroethane), HCFC-22 (chlorodifluoromethane), HCFC-123 (2,2-dichloro-1,1,1-trifluoroethane), HCFC-124 (2-chloro-1,1,1,2-tetrafluoroethane), HCFC-124a (1-chloro-1,1,2,2-tetrafluoroethane), HCFC-141b (1,1-dichloro-1-fluoroethane), HCFC-142b (1-chloro-1,1-difluoroethane), HCFC-151a (1-chloro-1-fluoroethane), HCFC-244bb (2-chloro-1,1,1,2-tetrafluoropropane), HCC-40 (chloromethane), HFO-1141 (fluoroethylene), HCFO-1130 (1,2-dichloroethylene, E- and/or Z-isomer), HCFO-1130a (1,1-dichloroethylene), HCFO-1131 (1-chloro-2-fluoroethylene, E- and/or Z-isomer), HCFO-1131a (1-chloro-1-fluoroethylene), HCFO-1122 (2-chloro-1,1-difluoroethylene), HFO-1123 (trifluoroethylene), HFO-1234ye (1,2,3,3-tetrafluoropropene), HFO-1243zf (3,3,3-trifluoropropene), HFO-1225yeZ (1,2,3,3,3-pentafluoropropene), HFO-1225zc (1,1,3,3,3-pentafluoropropene), PFC-116 (hexafluoroethane), PFC-C216 (hexafluorocyclopropane), PFC-218 (octafluoropropane), PFC-C318 (octafluorocyclebutane), PFC-1216 (hexafluoropropene), PFC-31-10mc (decafluorobutane), PFC-31-10my (2-trifluoromethyl-1,1,1,2,3,3,3-heptafluoropropane), 2-chloro-1,1,2-trifluoroethylene (CFC-1113), 1,1,1,3,3-pentafluorobutane (HFC-365mfc), 1,1,1,2,3,4,4,5,5,5-decafluoropentane (HFC-43-10mee), 1,1,1,2,2,3,4,5,5,6,6,7,7-tetradecafluoroheptane, hexafluorobutadiene, 3,3,3-trifluoropropyne, deuterated hydrocarbons, deuterated hydrofluorocarbons, perfluorocarbons, fluoroethers, and mixtures thereof. In some embodiments, the tracer is a blend containing two or more hydrofluorocarbons, or one hydrofluorocarbon in combination with one or more perfluorocarbons. In other embodiments, the tracer is a blend of at least one CFC and at least one HCFC, HFC, or PFC.

In another embodiment, provided herein is a storage container for refrigerant containing the compositions comprising HFO-1225yeE, HFO-1234zeE, and optionally HFC-134, as described herein, wherein the refrigerant comprises gaseous and liquid phases.

The storage container will be properly prepared for loading with the present compositions by evacuation and heating such that there are limits on the amount of water and/or oxygen to prevent reaction or degradation of the refrigerant portion of the compositions within the container. In one embodiment, the water is limited to 0.1 to 200 ppm by weight, or 0.1 to 100 ppm by weight, or 0.1 to 50 ppm by weight or 0.1 to 10 ppm by weight. In another embodiment, the oxygen is limited to 0.35 volume percent or less. In another embodiment, the oxygen is present from about 0.01 to 0.35 volume percent. In yet another embodiment, the oxygen is limited to 0.01 to 0.25 volume percent. And in yet another embodiment, the oxygen is limited to 0.01 to 0.15 volume percent.

The container for storing the foregoing compositions can be constructed of any suitable material and design that is capable of sealing the compositions therein while maintaining gaseous and liquids phases. Examples of suitable containers comprise pressure resistant containers such as a tank, a filling cylinder, and a secondary filing cylinder. The container can be constructed from any suitable material such as carbon steel, manganese steel, chromium-molybdenum steel, among other low-alloy steels, any stainless steel and in some cases an aluminum alloy.

The compositions of the present invention may be prepared by any convenient method to combine the desired amount of the individual components. A preferred method is to weigh the desired component amounts and thereafter combine the components in an appropriate vessel. Agitation may be used, if desired. In another embodiment, any of the foregoing refrigerant compositions can be prepared by blending HFO-1225yeE, HFO-1234zeE, and optionally HFC-134.

Methods, Processes and Apparatus

Vapor-compression refrigeration, air-conditioning, or heat pump systems include an evaporator, a compressor, a condenser, and an expansion device. A vapor-compression cycle re-uses refrigerant in multiple steps producing a cooling effect in one step and a heating effect in a different step. The cycle can be described simply as follows. Liquid refrigerant enters an evaporator through an expansion device, and the liquid refrigerant boils in the evaporator, by withdrawing heat from the environment, at a low temperature to form a gas and produce cooling. The low-pressure gas enters a compressor where the gas is compressed to raise its pressure and temperature. The higher-pressure (compressed) gaseous refrigerant then enters the condenser in which the refrigerant condenses and discharges its heat to the environment. The refrigerant returns to the expansion device through which the liquid expands from the higher-pressure level in the condenser to the low-pressure level in the evaporator, thus repeating the cycle.

In one embodiment, provided herein is process for producing cooling comprising evaporating any of the compositions as described herein in the vicinity of a body to be cooled and thereafter condensing said composition.

In another embodiment, provided herein is a process for producing heating comprising condensing any of the compositions as described herein in the vicinity of a body to be heated and thereafter evaporating said composition.

A body to be cooled or heated may be defined as any space, location object or body for which it is desirable to provide cooling or heating. Examples include, but are not limited to, spaces (open or enclosed) requiring air conditioning, cooling, or heating, such as a room, an apartment, or building, such as an apartment building, university dormitory, townhouse, or other attached house or single-family home, hospitals, office buildings, supermarkets, college or university classrooms or administration buildings and automobile or truck passenger compartments. Additionally, a body to be cooled may include electronic devices, such as computer equipment, central processing units (CPU), datacenters, server banks, and personal computing devices, among others.

In some cases, such as for chillers, the body to be cooled is a secondary fluid that is then transferred to a space, location object or body for which it is desirable to provide cooling. The secondary fluid can be water, an aqueous brine solution (such as $CaCl_2$, $MgCl_2$, for cooling equipment in a manufacturing process), or an aqueous glycol or alcohol solution, as non-limiting examples. The same may be true for water heating heat pumps, wherein the body to be heated is water to be transferred to a home for heating or for heating water for use in appliances, for instance.

In the cooling process, by "in the vicinity of" is meant that the evaporator of the system containing the refrigerant blend of the present invention is located either within or adjacent to the body to be cooled, such that air moving over the evaporator would move into or around the body to be cooled. In the process for producing heating, "in the vicinity of" means that the condenser of the system containing the refrigerant is located either within or adjacent to the body to be heated, such that the air moving over the condenser would move into or around the body to be heated. In some embodiments, for heat transfer, "in the vicinity of" may mean that the body to be cooled is immersed directly in the refrigerant or tubes containing the refrigerant run into or around internally, and out of electronic equipment, for instance.

In another embodiment, a system for cooling is provided, said system comprising an evaporator, compressor, condenser, and expansion device, said system containing any of the compositions disclosed herein.

In one embodiment, the system for cooling may be a chiller. In some embodiments, the chiller is a direct expansion evaporator chiller or flooded evaporator chiller. In an additional embodiment, a chiller may use a falling film evaporator. In some embodiments, the heat exchanger for a chiller will operate in counter-current mode, increasing efficiency of the system. In some embodiments, the chiller comprises a compressor, which is selected from a centrifugal, screw, scroll or reciprocating compressor.

A chiller is a heat transfer device often used for cooling (or chilling) a liquid that is then used to cool or heat a secondary location. It is often used for air conditioning of a building such as an office building, apartment building or hospital for instance. A chiller may be used for cooling equipment, such as distillation columns, in a manufacturing process. Additionally, a chiller may be used for refrigeration of supermarket display cases.

In another embodiment, a system for heating is provided, said system comprising an evaporator, compressor, condenser, and expansion device, said system containing any of the compositions disclosed herein. In one embodiment, the system for heating may be a heat pump. In one embodiment, a heat pump may be a residential heat pump for heating air. In another embodiment, a heat pump may be a high temperature heat pump. In another embodiment, a heat pump may be a high temperature heat pump for heating water.

Heat pumps may include flooded evaporators or direct expansion evaporators similarly to chillers. Heat pumps may utilize positive displacement compressors or dynamic compressors (e.g., centrifugal compressors). Positive displacement compressors include reciprocating, screw, or scroll compressors. Of note are heat pumps that use screw compressors. Also, of note are heat pumps that use centrifugal compressors.

Residential heat pumps are used to produce heated air to warm a residence or home (including single family or multi-unit attached homes) and produce maximum condenser operating temperatures from about 30° C. to about 50° C.

Of note are high temperature heat pumps that may be used to heat air, water, another heat transfer medium or some portion of an industrial process, such as a piece of equipment, storage area or process stream. In one embodiment, these high temperature heat pumps use condenser operating temperatures greater than about 55° C. In one embodiment, the condenser operating temperature for a high temperature heat pump is from about 55° C. to about 150° C. In one embodiment, the system for heating may be a water heating heat pump.

Chillers and heat pumps can be characterized by the compressor used therein. Compressors can be generally classified as reciprocating, rotary, jet, centrifugal, scroll, screw or axial-flow, depending on the mechanical means to compress the fluid, or as positive-displacement (e.g., reciprocating, scroll or screw) or dynamic (e.g., centrifugal or jet), depending on how the mechanical elements act on the fluid to be compressed. In one embodiment, the present inventive apparatus utilizes a centrifugal-type compressor.

A centrifugal compressor uses rotating elements to accelerate the refrigerant radially, and typically includes an impeller and diffuser housed in a casing. Centrifugal compressors usually take fluid in at an impeller eye, or central inlet of a circulating impeller, and accelerate it radially outward. Some static pressure rise occurs in the impeller, but most of the pressure rise occurs in the diffuser section of the casing, where velocity is converted to static pressure. Each impeller-diffuser set is a stage of the compressor. Centrifugal compressors are built with from 1 to 12 or more stages, depending on the final pressure desired and the volume of refrigerant to be handled.

The pressure ratio, or compression ratio, of a compressor is the ratio of absolute discharge pressure to the absolute inlet pressure. Pressure delivered by a centrifugal compressor is practically constant over a relatively wide range of capacities.

Positive displacement compressors draw vapor into a chamber, and the chamber decreases in volume to compress the vapor. After being compressed, the vapor is forced from the chamber by further decreasing the volume of the chamber to zero or nearly zero. A positive displacement compressor can build up a pressure, which is limited only by the volumetric efficiency and the strength of the parts to withstand the pressure.

Unlike a positive displacement compressor, a centrifugal compressor depends entirely on the centrifugal force of the high-speed impeller to compress the vapor passing through the impeller. There is no positive displacement, but rather what is called dynamic-compression.

A multi-stage impeller system may be used in a centrifugal compressor to improve compressor efficiency thus requiring less power in use. For a two-stage system, in operation, the discharge of the first stage impeller goes to the suction intake of a second impeller. Both impellers may operate by use of a single shaft (or axle). Each stage can build up a compression ratio of about 4 to 1; that is, the absolute discharge pressure can be four times the absolute suction pressure. Several examples of two-stage centrifugal compressor systems, particularly for automotive applications, are described in U.S. Pat. Nos. 5,065,990 and 5,363,674.

The pressure a centrifugal compressor can develop depends on the tip speed of the impeller. Tip speed is the speed of the impeller measured at its tip and is related to the diameter of the impeller and its revolutions per minute. Tip speed and impeller diameter can be estimated by developing fundamental relationships for refrigeration equipment that use centrifugal compressors. The torque an impeller ideally imparts to a gas is defined as $$T = m*(v_2*r_2 - v_1*r_1) \qquad \text{Equation 1}$$

where
T=torque, Newton-meters
m=mass rate of flow, kg/sec
v2=tangential velocity of refrigerant leaving impeller (tip speed), meters/sec
r2=radius of exit impeller, meters
v1=tangential velocity of refrigerant entering impeller, meters/sec
r1=radius of inlet of impeller, meters Assuming the refrigerant enters the impeller in an essentially axial direction, the tangential component of the velocity v1=0, therefore $$T = m*v_2*r_2 \qquad \text{Equation 2}$$

The power required at the shaft is the product of the torque and the rotational speed $$P = T*w \qquad \text{Equation 3}$$

where
P=power, W
w=rotative speed, revolutions/second
therefore, $$P = T*w = m*v_2*r_2*w \qquad \text{Equation 4}$$

At low refrigerant flow rates, the tip speed of the impeller and the tangential velocity of the refrigerant are nearly identical; therefore $$r_2*w = v_2 \qquad \text{Equation 5}$$

and $$P = m*v_2*v_2 \qquad \text{Equation 6}$$

Another expression for ideal power is the product of the mass rate of flow and the isentropic work of compression, $$P = m*H_i*(1000 \text{ J/kJ}) \qquad \text{Equation 7}$$

where
$H_i$=Difference in enthalpy of the refrigerant from a saturated vapor at the evaporating conditions to saturated condensing conditions, kJ/kg.

Combining the two expressions Equation 6 and 7 produces, $$v_2*v_2 = 1000*H_i \qquad \text{Equation 8}$$

Although Equation 8 is based on some fundamental assumptions, it provides a good estimate of the tip speed of the impeller.

The capacity of the centrifugal compressor is determined by the size of the passages through the impeller. This makes the size of the compressor more dependent on the pressure required than the capacity. Large centrifugal compressors typically operate at 3000 to 7000 revolutions per minute (rpm). Small scale centrifugal compressors (mini-centrifugals) are designed for high speeds, from about 20,000 RPM to about 75,000 RPM, and have small impeller diameter, typically less than about 0.15 meters (about 6 inches). In another embodiment, mini-centrifugal compressors operate at impeller speeds of 30,000 to 50,000 RPM and have impeller diameter of less than 0.10 meters (about 4 inches).

In another embodiment, disclosed herein is a method for replacing HFO-1234zeE in a system for cooling or heating comprising providing the composition of any of the foregoing embodiments to the system. In another embodiment, the method is replacing HFO-1234zeE in a chiller. In another embodiment, the method is replacing HFO-1234zeE in a heat pump. In another embodiment, the method is replacing HFO-1234zeE in a water heating heat pump. In another embodiment, the method is replacing HFO-1234zeE in an air heating heat pump. In another embodiment the method is replacing HFO-1234ze in a high temperature heat pump.

In an embodiment, wherein the system for cooling or heating comprises a centrifugal compressor, in order to retrofit the system without major modifications, it is useful for the tip speed (or impeller diameter) for the refrigerant being replaced and that which is used for replacement are a good match. In other words, a good replacement for HFO-1234zeE in a centrifugal system will provide a tip speed very close to that of HFO-1234zeE. The compositions disclosed herein provide such a close match for tip speed of HFO-1234zeE, and thus make good refrigerants for field retrofit of HFO-1234zeE in centrifugal systems. Additionally, R-515B (ASHRAE designation for a mixture of 8.9 wt % of HFC-227ea and 91.1 wt % of HFO-1234zeE) and R-515A (ASHRAE designation for a mixture of 12 wt % HFC-227ea and 88 wt % HFO-1234zeE) are non-flammable alternatives to the use of HFO-1234zeE in centrifugal systems. R-515A and R-515B have similar performance to HFO-1234zeE in centrifugal systems and has a GWP of 389 and 289 (AR4), respectfully. Therefore, the presently claimed compositions containing HFO-1225yeE, HFO-1234zeE, and optionally HFC-134 will also serve as a good match for field retrofit of R-515A or R-515B with lower GWP and similar performance including similar tip speeds for centrifugal systems.

The invention will be described in greater detail below by way of specific examples. The following examples are offered for illustrative purposes and are not intended to limit the invention in any manner. Those of skill in the art will readily recognize a variety of non-critical parameters which can be changed or modified to yield essentially the same results.

EXAMPLES

Example 1

Flammability

The flammability of several compositions was determined by testing under ASTM (American Society of Testing and Materials) E-681, with an electronic ignition source at 60° C. Both the nominal liquid composition and the vapor above the liquid at −40° C. were tested. If both liquid and vapor compositions were non-flammable, the composition was determined to be non-flammable as given below in Table 1.

TABLE 1

| Composition components | Non-flammable composition, wt % | Flammable composition, wt % |
| --- | --- | --- |
| HFO-1234zeE/HFC-134 | 69.9/30.1 | 70/30 |
| HFO-1234zeE/HFO-1225ye(E) | 64.5/35.5 | 65.3/34.7 |

The results indicate that compositions containing HFO-1234zeE and HFC-134 will be non-flammable with less than or equal to 69.9 weight percent of HFO-1234zeE. Also, the results indicate that compositions containing HFO-1234zeE and HFO-1225yeE will be non-flammable with less than or equal to 64.5 weight percent (e.g., 64 wt %) HFO-1234zeE (and greater than or equal to 35.5 weight percent (e.g., 36 wt %) HFO-1225yeE). With reference to FIG. 1, it can be seen that the broadest claimed range for the ternary composition is entirely on the non-flammable side of the flammability boundary. Thus, all the claimed compositions containing HFO-1225yeE, HFO-1234zeE, and HFC-134 are non-flammable at 60° C.

Example 2

Cooling Performance

Cooling performance at typical conditions for air conditioning and heat pump apparatus for compositions containing HFO-1234zeE and HFO-1225yeE is determined and displayed in Table 2 as compared to HFO-1234zeE. The GWP values are from the Intergovernmental Panel on Climate Change (IPCC) Fourth Assessment Report, Working Group I, 2007 (AR4). Average temperature glide (Average Temp Glide: the average of the temperature glide in the evaporator and the temperature glide in the condenser), cooling capacity (Capacity) relative to 1234zeE, COP relative to 1234zeE, and compressor discharge temperatures (Compr Disch Temp) are calculated from physical property measurements for the compositions of the present invention at the following specific condition:

| | |
| --- | --- |
| Evaporator temperature | 5° C. |
| Condenser temperature | 40° C. |
| Return temperature | 10° C. |
| Amount of subcooling | 0 K |
| Compressor efficiency | 85% |

TABLE 2

| 1234zeE/ 1225yeE (wt %) | GWP (AR4) | Avg. Glide, ° C. | Relative Capacity 1234zeE | Relative COP 1234zeE | Suction Pressure, MPa | Discharge Pressure, MPa | Compressor Discharge Temp, ° C. | Flammable Yes/No |
| --- | --- | --- | --- | --- | --- | --- | --- | --- |
| 63/37 | 4 | 0.10 | 95.8% | 100.1% | 0.251 | 0.734 | 45.8 | No |
| 62/38 | 4 | 0.10 | 95.7% | 100.1% | 0.251 | 0.733 | 45.8 | No |
| 61/39 | 4 | 0.10 | 95.6% | 100.1% | 0.251 | 0.732 | 45.7 | No |
| 60/40 | 4 | 0.10 | 95.5% | 100.1% | 0.250 | 0.731 | 45.7 | No |
| 55/45 | 4 | 0.10 | 94.8% | 100.1% | 0.249 | 0.726 | 45.6 | No |

TABLE 2-continued

| 1234zeE/1225yeE (wt %) | GWP (AR4) | Avg. Glide, °C. | Relative Capacity 1234zeE | Relative COP 1234zeE | Suction Pressure, MPa | Discharge Pressure, MPa | Compressor Discharge Temp, °C. | Flammable Yes/No |
|---|---|---|---|---|---|---|---|---|
| 50/50 | 4 | 0.09 | 94.2% | 100.1% | 0.247 | 0.721 | 45.5 | No |
| 45/55 | 3 | 0.08 | 93.6% | 100.2% | 0.246 | 0.717 | 45.4 | No |
| 40/60 | 3 | 0.07 | 93.1% | 100.2% | 0.245 | 0.712 | 45.3 | No |
| 35/65 | 3 | 0.05 | 92.6% | 100.2% | 0.244 | 0.708 | 45.2 | No |
| 30/70 | 3 | 0.04 | 92.1% | 100.2% | 0.242 | 0.705 | 45.1 | No |
| 25/75 | 2 | 0.03 | 91.7% | 100.2% | 0.241 | 0.702 | 45.0 | No |
| 20/80 | 2 | 0.02 | 91.4% | 100.2% | 0.241 | 0.700 | 44.9 | No |
| 15/85 | 2 | 0.01 | 91.1% | 100.2% | 0.240 | 0.698 | 44.9 | No |
| 10/90 | 2 | 0.01 | 90.9% | 100.2% | 0.239 | 0.696 | 44.9 | No |
| 5/95 | 1 | 0.01 | 90.8% | 100.1% | 0.237 | 0.696 | 44.9 | No |

The data shows that all the compositions of the present invention provide non-flammable compositions that also have low GWP, low average temperature glide, capacity within 10% of HFO-1234zeE alone and COP equivalent to that of HFO-1234zeE.

Example 3

Cooling Performance

Cooling performance at typical conditions for air conditioning and heat pump apparatus for compositions containing HFO-1234zeE, HFO-1225yeE, and HFC-134 is determined and displayed in Table 3 as compared to HFO-1234zeE. The GWP values are from the Intergovernmental Panel on Climate Change (IPCC) Fourth Assessment Report, Working Group I, 2007 (AR4). Average temperature glide (Average Temp Glide: the average of the temperature glide in the evaporator and the temperature glide in the condenser), cooling capacity (Capacity) relative to 1234zeE, COP relative to 1234zeE, and compressor discharge temperatures (Compr Disch Temp) are calculated from physical property measurements for the compositions of the present invention at the following specific condition:

| | |
|---|---|
| Evaporator temperature | 5° C. |
| Condenser temperature | 40° C. |
| Return temperature | 10° C. |
| Amount of subcooling | 0 K |
| Compressor efficiency | 85% |

TABLE 3

| R134/1234zeE/1225yeE (wt %) | GWP (AR4) | Avg. Glide, °C. | Relative Capacity 1234zeE | Relative COP 1234zeE | Suction Pressure, MPa | Discharge Pressure, MPa | Compressor Discharge Temp, °C. | Flammable Yes/No |
|---|---|---|---|---|---|---|---|---|
| 27/8/65 | 299 | 0.36 | 100.9% | 100.6% | 0.264 | 0.766 | 46.5 | No |
| 16/64/20 | 181 | 0.21 | 102.2% | 100.3% | 0.265 | 0.779 | 46.9 | No |
| 13/64/23 | 148 | 0.22 | 101.1% | 100.3% | 0.263 | 0.771 | 46.7 | No |
| 12/49/39 | 136 | 0.28 | 98.9% | 100.3% | 0.258 | 0.755 | 46.3 | No |
| 12/58/30 | 136 | 0.25 | 100.0% | 100.3% | 0.261 | 0.763 | 46.5 | No |
| 12/62/26 | 137 | 0.23 | 100.4% | 100.3% | 0.262 | 0.767 | 46.6 | No |
| 11/21/68 | 123 | 0.28 | 95.7% | 100.3% | 0.251 | 0.731 | 45.7 | No |
| 10/60/30 | 114 | 0.23 | 99.4% | 100.2% | 0.259 | 0.760 | 46.4 | No |
| 10/55/35 | 114 | 0.25 | 98.8% | 100.3% | 0.258 | 0.755 | 46.3 | No |
| 10/50/40 | 114 | 0.26 | 98.2% | 100.3% | 0.257 | 0.750 | 46.2 | No |
| 10/45/45 | 114 | 0.27 | 97.7% | 100.3% | 0.255 | 0.746 | 46.1 | No |
| 10/40/50 | 113 | 0.27 | 97.1% | 100.3% | 0.254 | 0.741 | 46.0 | No |
| 10/35/55 | 113 | 0.27 | 96.6% | 100.3% | 0.253 | 0.737 | 45.9 | No |
| 10/30/60 | 113 | 0.27 | 96.1% | 100.3% | 0.252 | 0.733 | 45.8 | No |
| 10/25/65 | 113 | 0.26 | 95.7% | 100.3% | 0.251 | 0.730 | 45.7 | No |
| 10/20/70 | 112 | 0.26 | 95.3% | 100.3% | 0.250 | 0.728 | 45.6 | No |
| 10/15/75 | 112 | 0.26 | 95.1% | 100.3% | 0.250 | 0.726 | 45.5 | No |
| 10/10/80 | 112 | 0.27 | 94.9% | 100.3% | 0.249 | 0.725 | 45.5 | No |
| 10/5/85 | 112 | 0.28 | 94.8% | 100.3% | 0.249 | 0.725 | 45.4 | No |
| 8/11/81 | 90 | 0.23 | 94.1% | 100.3% | 0.247 | 0.720 | 45.3 | No |
| 5/60/35 | 59 | 0.18 | 97.5% | 100.2% | 0.255 | 0.746 | 46.1 | No |
| 5/55/40 | 59 | 0.19 | 96.8% | 100.2% | 0.254 | 0.741 | 46.0 | No |
| 5/50/45 | 59 | 0.19 | 96.2% | 100.2% | 0.252 | 0.736 | 45.8 | No |
| 5/45/50 | 58 | 0.19 | 95.6% | 100.2% | 0.251 | 0.731 | 45.7 | No |
| 5/40/55 | 58 | 0.18 | 95.1% | 100.2% | 0.250 | 0.727 | 45.6 | No |
| 5/35/60 | 58 | 0.18 | 94.6% | 100.2% | 0.248 | 0.723 | 45.5 | No |
| 5/30/65 | 58 | 0.17 | 94.1% | 100.3% | 0.247 | 0.719 | 45.4 | No |
| 5/25/70 | 57 | 0.16 | 93.7% | 100.3% | 0.246 | 0.716 | 45.4 | No |
| 5/20/75 | 57 | 0.16 | 93.4% | 100.2% | 0.246 | 0.714 | 45.3 | No |
| 5/15/80 | 57 | 0.16 | 93.1% | 100.2% | 0.245 | 0.712 | 45.2 | No |
| 5/10/85 | 57 | 0.16 | 92.9% | 100.2% | 0.244 | 0.711 | 45.2 | No |
| 5/5/90 | 56 | 0.18 | 92.8% | 100.2% | 0.244 | 0.711 | 45.2 | No |
| 4/64/32 | 48 | 0.15 | 97.6% | 100.1% | 0.255 | 0.747 | 46.1 | No |
| 4/2/94 | 45 | 0.17 | 92.4% | 100.2% | 0.242 | 0.708 | 45.1 | No |

The data indicate that compositions containing HFO-1234zeE, HFO-1225yeE, and HFC-134 provide non-flammable refrigerants with cooling capacity within 10% of that for HFO-1234zeE alone, COP equivalent or slightly improved over that for HFO-1234zeE alone, and GWP less than 300, or even less than 150.

Example 4

Heating Performance

Heating performance at typical conditions for residential heat pump apparatus for compositions containing HFO-1234zeE, HFO-1225yeE, and HFC-134 is determined and displayed in Table 4 as compared to HFO-1234zeE alone. The GWP values are from the Intergovernmental Panel on Climate Change (IPCC) Fourth Assessment Report, Working Group 1, 2007 (AR4). Temperature glide in the evaporator and condenser, heating capacity (Capacity) relative to 1234zeE, and COP relative to 1234zeE are calculated from physical property measurements for the compositions of the present invention at the following specific condition:

| Evaporator temperature | 10° C. |
|---|---|
| Condenser temperature | 65° C. |
| Superheat | 5.0 K |
| Amount of subcooling | 10 K |
| Compressor efficiency | 70% |

TABLE 4

| Composition 1234zeE/1225yeE/134, weight fraction | GWP | COP relative to 1234zeE, % | Capacity relative to 1234zeE, % | Evap temp glide, K | Cond temp glide, K |
|---|---|---|---|---|---|
| 0.01/0.86/0.13 | 145 | 99.5 | 94.5 | 0.58 | 0.54 |
| 0.01/0.87/0.12 | 134 | 99.5 | 93.9 | 0.58 | 0.52 |
| 0.02/0.92/0.06 | 67 | 99.4 | 90.3 | 0.44 | 0.37 |
| 0.03/0.84/0.13 | 145 | 99.6 | 94.8 | 0.52 | 0.53 |
| 0.04/0.86/0.10 | 112 | 99.5 | 93.2 | 0.49 | 0.48 |
| 0.05/0.83/0.12 | 134 | 99.6 | 94.5 | 0.47 | 0.51 |
| 0.06/0.82/0.12 | 134 | 99.6 | 94.6 | 0.45 | 0.50 |
| 0.07/0.81/0.12 | 134 | 99.6 | 94.7 | 0.43 | 0.50 |
| 0.08/0.85/0.07 | 79 | 99.5 | 92.0 | 0.37 | 0.38 |
| 0.09/0.86/0.05 | 57 | 99.5 | 90.9 | 0.31 | 0.30 |
| 0.10/0.84/0.06 | 68 | 99.5 | 91.7 | 0.32 | 0.34 |
| 0.11/0.82/0.07 | 79 | 99.5 | 92.4 | 0.32 | 0.37 |
| 0.12/0.80/0.08 | 90 | 99.6 | 93.1 | 0.33 | 0.40 |
| 0.13/0.78/0.09 | 10 | 99.6 | 93.8 | 0.32 | 0.42 |
| 0.14/0.73/0.13 | 145 | 99.8 | 96.1 | 0.33 | 0.49 |
| 0.15/0.72/0.13 | 145 | 99.8 | 96.2 | 0.32 | 0.48 |
| 0.16/0.71/0.13 | 145 | 99.8 | 96.3 | 0.31 | 0.48 |
| 0.17/0.74/0.09 | 101 | 99.7 | 94.3 | 0.28 | 0.41 |
| 0.18/0.76/0.06 | 68 | 99.6 | 92.8 | 0.24 | 0.33 |
| 0.19/0.75/0.06 | 68 | 99.6 | 92.9 | 0.23 | 0.32 |
| 0.20/0.77/0.03 | 35 | 99.5 | 91.4 | 0.16 | 0.20 |
| 0.21/0.73/0.06 | 68 | 99.6 | 93.2 | 0.22 | 0.32 |
| 0.22/0.68/0.10 | 113 | 99.8 | 95.4 | 0.25 | 0.42 |
| 0.23/0.64/0.13 | 146 | 99.9 | 97.0 | 0.26 | 0.46 |
| 0.24/0.66/0.10 | 113 | 99.8 | 95.6 | 0.24 | 0.41 |
| 0.25/0.65/0.10 | 113 | 99.8 | 95.8 | 0.23 | 0.41 |
| 0.26/0.69/0.05 | 58 | 99.7 | 93.3 | 0.17 | 0.28 |
| 0.27/0.61/0.12 | 135 | 99.9 | 97.0 | 0.23 | 0.43 |
| 0.28/0.67/0.05 | 58 | 99.7 | 93.5 | 0.17 | 0.28 |
| 0.29/0.63/0.08 | 91 | 99.8 | 95.2 | 0.20 | 0.36 |
| 0.30/0.69/0.01 | 14 | 99.6 | 91.6 | 0.09 | 0.12 |
| 0.31/0.59/0.10 | 113 | 99.9 | 96.4 | 0.20 | 0.40 |
| 0.32/0.56/0.12 | 135 | 99.9 | 97.5 | 0.21 | 0.42 |
| 0.33/0.64/0.03 | 36 | 99.7 | 93.1 | 0.12 | 0.21 |
| 0.34/0.54/0.12 | 135 | 100.0 | 97.7 | 0.20 | 0.41 |
| 0.35/0.60/0.05 | 58 | 99.7 | 94.4 | 0.14 | 0.28 |
| 0.36/0.57/0.07 | 80 | 99.8 | 95.5 | 0.16 | 0.33 |
| 0.37/0.52/0.11 | 124 | 100.0 | 97.5 | 0.19 | 0.39 |

TABLE 4-continued

| Composition 1234zeE/1225yeE/134, weight fraction | GWP | COP relative to 1234zeE, % | Capacity relative to 1234zeE, % | Evap temp glide, K | Cond temp glide, K |
|---|---|---|---|---|---|
| 0.38/0.49/0.13 | 146 | 100.0 | 98.6 | 0.19 | 0.40 |
| 0.39/0.59/0.02 | 25 | 99.7 | 93.3 | 0.09 | 0.18 |
| 0.40/0.55/0.05 | 58 | 99.8 | 95.0 | 0.13 | 0.27 |
| 0.41/0.52/0.07 | 80 | 99.9 | 96.1 | 0.15 | 0.32 |
| 0.42/0.47/0.11 | 125 | 100.0 | 98.1 | 0.17 | 0.37 |
| 0.43/0.53/0.04 | 47 | 99.8 | 94.8 | 0.11 | 0.24 |
| 0.44/0.48/0.08 | 92 | 99.9 | 96.9 | 0.15 | 0.33 |
| 0.45/0.51/0.04 | 47 | 99.8 | 95.1 | 0.11 | 0.24 |
| 0.46/0.49/0.05 | 59 | 99.8 | 95.7 | 0.12 | 0.27 |
| 0.47/0.52/0.01 | 14 | 99.7 | 93.8 | 0.06 | 0.15 |
| 0.48/0.39/0.13 | 147 | 100.1 | 99.6 | 0.15 | 0.36 |
| 0.49/0.41/0.10 | 114 | 100.0 | 98.4 | 0.14 | 0.34 |
| 0.50/0.43/0.07 | 81 | 99.9 | 97.1 | 0.13 | 0.30 |
| 0.51/0.36/0.13 | 147 | 100.1 | 100.0 | 0.14 | 0.34 |
| 0.52/0.38/0.10 | 114 | 100.0 | 98.8 | 0.13 | 0.32 |
| 0.53/0.42/0.05 | 59 | 99.9 | 96.6 | 0.10 | 0.25 |
| 0.54/0.45/0.01 | 15 | 99.8 | 94.7 | 0.06 | 0.15 |
| 0.55/0.38/0.07 | 81 | 100.0 | 97.7 | 0.11 | 0.28 |
| 0.56/0.40/0.04 | 48 | 99.9 | 96.5 | 0.09 | 0.23 |
| 0.57/0.42/0.01 | 15 | 99.8 | 95.1 | 0.06 | 0.15 |
| 0.59/0.36/0.05 | 59 | 99.9 | 97.3 | 0.09 | 0.24 |
| 0.60/0.39/0.01 | 15 | 99.8 | 95.5 | 0.05 | 0.15 |
| 0.61/0.37/0.02 | 26 | 99.8 | 96.1 | 0.06 | 0.17 |
| 0.62/0.37/0.01 | 15 | 99.8 | 95.8 | 0.05 | 0.15 |
| 0.63/0.36/0.01 | 15 | 99.8 | 95.9 | 0.05 | 0.15 |

The data indicate that compositions containing HFO-1234zeE, HFO-1225yeE, and HFC-134 provide non-flammable refrigerants with heating capacity within 10% of that for HFO-1234zeE alone, COP very close to that for HFO-1234zeE alone, and GWP less than 150.

Example 5

Tip Speed for Centrifugal Compressors

Table 5 shows performance of a cooling system, in particular a centrifugal chiller, and the estimated tip speed provided by the compositions of the present invention as compared to HFO-1234zeE alone. The GWP values are from the Intergovernmental Panel on Climate Change (IPCC) Fourth Assessment Report, Working Group I, 2007 (AR4). Cooling capacity (Capacity) relative to 1234zeE, and COP relative to 1234zeE are calculated from physical property measurements for the compositions of the present invention at the following specific condition:

| Evaporator temperature | 5° C. |
|---|---|
| Condenser temperature | 40° C. |
| Return temperature | 10° C. |
| Amount of subcooling | 0 K |
| Compressor efficiency | 85% |

TABLE 5

| Weight fraction | | | GWP | Relative Capacity | Relative COP | Compressor tip speed, Relative to |
|---|---|---|---|---|---|---|
| R-134 | R-1234zeE | R-1225yeE | (AR4) | R1234ze | R1234ze | R1234ze |
| 0.00 | 0.58 | 0.42 | 4 | 95.2% | 100.1% | 98.8% |
| 0.00 | 0.62 | 0.38 | 4 | 95.7% | 100.1% | 98.9% |
| 0.00 | 0.60 | 0.40 | 4 | 95.5% | 100.1% | 98.8% |
| 0.00 | 0.55 | 0.45 | 4 | 94.8% | 100.1% | 98.7% |
| 0.00 | 0.50 | 0.50 | 4 | 94.2% | 100.1% | 98.5% |
| 0.00 | 0.45 | 0.55 | 3 | 93.6% | 100.2% | 98.4% |
| 0.00 | 0.40 | 0.60 | 3 | 93.1% | 100.2% | 98.2% |
| 0.00 | 0.35 | 0.65 | 3 | 92.6% | 100.2% | 98.1% |
| 0.00 | 0.30 | 0.70 | 3 | 92.1% | 100.2% | 97.9% |
| 0.00 | 0.25 | 0.75 | 2 | 91.7% | 100.2% | 97.7% |
| 0.00 | 0.20 | 0.80 | 2 | 91.4% | 100.2% | 97.5% |
| 0.00 | 0.15 | 0.85 | 2 | 91.1% | 100.2% | 97.3% |
| 0.00 | 0.10 | 0.90 | 2 | 90.9% | 100.2% | 97.1% |
| 0.10 | 0.60 | 0.30 | 114 | 99.4% | 100.2% | 98.9% |
| 0.10 | 0.55 | 0.35 | 114 | 98.8% | 100.3% | 98.8% |
| 0.10 | 0.50 | 0.40 | 114 | 98.2% | 100.3% | 98.6% |
| 0.10 | 0.45 | 0.45 | 114 | 97.7% | 100.3% | 98.5% |
| 0.10 | 0.40 | 0.50 | 113 | 97.1% | 100.3% | 98.3% |
| 0.10 | 0.35 | 0.55 | 113 | 96.6% | 100.3% | 98.2% |
| 0.10 | 0.30 | 0.60 | 113 | 96.1% | 100.3% | 98.0% |
| 0.10 | 0.25 | 0.65 | 113 | 95.7% | 100.3% | 97.8% |
| 0.10 | 0.20 | 0.70 | 112 | 95.3% | 100.3% | 97.7% |
| 0.10 | 0.15 | 0.75 | 112 | 95.1% | 100.3% | 97.5% |
| 0.10 | 0.10 | 0.80 | 112 | 94.9% | 100.3% | 97.3% |
| 0.10 | 0.05 | 0.85 | 112 | 94.8% | 100.3% | 97.0% |
| 0.05 | 0.60 | 0.35 | 59 | 97.5% | 100.2% | 98.9% |
| 0.05 | 0.55 | 0.40 | 59 | 96.8% | 100.2% | 98.7% |
| 0.05 | 0.50 | 0.45 | 59 | 96.2% | 100.2% | 98.6% |
| 0.05 | 0.45 | 0.50 | 58 | 95.6% | 100.2% | 98.4% |
| 0.05 | 0.40 | 0.55 | 58 | 95.1% | 100.2% | 98.3% |
| 0.05 | 0.35 | 0.60 | 58 | 94.6% | 100.2% | 98.1% |
| 0.05 | 0.30 | 0.65 | 58 | 94.1% | 100.3% | 98.0% |
| 0.05 | 0.25 | 0.70 | 57 | 93.7% | 100.3% | 97.8% |
| 0.05 | 0.20 | 0.75 | 57 | 93.4% | 100.2% | 97.6% |
| 0.05 | 0.15 | 0.80 | 57 | 93.1% | 100.2% | 97.4% |
| 0.05 | 0.10 | 0.85 | 57 | 92.9% | 100.2% | 97.2% |
| 0.05 | 0.05 | 0.90 | 56 | 92.8% | 100.2% | 97.0% |
| 0.05 | 0.58 | 0.37 | 59 | 97.2% | 100.2% | 98.8% |
| 0.05 | 0.62 | 0.33 | 59 | 97.7% | 100.2% | 98.9% |
| 0.10 | 0.58 | 0.32 | 114 | 99.2% | 100.2% | 98.8% |
| 0.10 | 0.62 | 0.28 | 115 | 99.7% | 100.2% | 99.0% |
| 0.12 | 0.05 | 0.83 | 134 | 95.6% | 100.3% | 97.0% |
| 0.12 | 0.10 | 0.78 | 134 | 95.7% | 100.3% | 97.3% |
| 0.12 | 0.15 | 0.73 | 134 | 95.8% | 100.4% | 97.5% |
| 0.12 | 0.20 | 0.68 | 134 | 96.1% | 100.4% | 97.7% |
| 0.12 | 0.25 | 0.63 | 135 | 96.4% | 100.4% | 97.9% |
| 0.12 | 0.30 | 0.58 | 135 | 96.9% | 100.4% | 98.0% |
| 0.12 | 0.35 | 0.53 | 135 | 97.4% | 100.4% | 98.2% |
| 0.12 | 0.40 | 0.48 | 135 | 97.9% | 100.3% | 98.4% |
| 0.12 | 0.45 | 0.43 | 136 | 98.4% | 100.3% | 98.5% |
| 0.12 | 0.50 | 0.38 | 136 | 99.0% | 100.3% | 98.6% |
| 0.12 | 0.55 | 0.33 | 136 | 99.6% | 100.3% | 98.8% |
| 0.12 | 0.58 | 0.30 | 136 | 100.0% | 100.3% | 98.9% |
| 0.12 | 0.60 | 0.28 | 136 | 100.2% | 100.3% | 98.9% |
| 0.12 | 0.62 | 0.26 | 137 | 100.4% | 100.3% | 99.0% |

The data indicate that compositions containing HFO-1234zeE, HFO-1225yeE, and optionally HFC-134 provide non-flammable refrigerants with tip speeds within 5% of that for HFO-1234zeE alone, and many provide tip speeds within 2% of that for HFO-1234zeE alone, while also providing similar or improved cooling performance. Thus, these compositions would serve as non-flammable, low GWP replacements even in field retrofit scenarios for centrifugal systems designed for HFO-1234zeE or R-515A or R-515B.

What is claimed is:

1. A composition comprising a refrigerant comprising from about 10 to 98 weight percent HFO-1225yeE, about 1 to 64 weight percent HFO-1234zeE, and about 1 to 27 weight percent HFC-134.

2. The composition of claim 1, said refrigerant comprising from about 10 to 78 weight percent HFO-1225yeE, about 11 to 64 weight percent HFO-1234zeE, and about 11 to 27 weight percent HFC-134.

3. The composition of claim 1, said refrigerant comprising from about 23 to 78 weight percent HFO-1225yeE, about 11 to 64 weight percent HFO-1234zeE, and about 11 to 13 weight percent HFC-134.

4. The composition of claim 1, said refrigerant comprising from about 23 to 39 weight percent HFO-1225yeE, about 12 to 64 weight percent HFO-1234zeE, and about 12 to 13 weight percent HFC-134.

5. The composition of claim 1, wherein said refrigerant is non-flammable by ASTM E681.

6. The composition of claim 1 that provides volumetric cooling capacity within 10% of HFO-1234zeE at the same operating conditions, preferably within 8% and more preferably within 5%.

7. The composition of claim 1, further comprising at least one lubricant, at least one stabilizer, or at least one tracer.

8. The composition of claim 7, wherein said lubricant is selected from the group consisting of polyalkylene glycol, polyol ester, and polyvinyl ether, and combinations thereof.

9. The composition of claim 7 wherein said stabilizer is selected from the group consisting of nitromethane, ascorbic acid, terephthalic acid, azoles, phenolic compounds, cyclic monoterpenes, terpenes, phosphites, phosphates, phosphonates, thiols, lactones, and combinations thereof.

10. The composition of claim 9 wherein said stabilizer is selected from the group consisting of tolutriazole, benzotriazole, tocopherol, hydroquinone, t-butyl hydroquinone, 2,6-di-tertbutyl-4-methylphenol, fluorinated epoxides, n-butyl glycidyl ether, hexanediol diglycidyl ether, allyl glycidyl ether, butylphenylglycidyl ether, d-limonene, α-terpinene, β-terpinene, γ-terpinene, α-pinene, β-pinene, butylated hydroxytoluene, and combinations thereof.

11. The composition of claim 7, wherein said tracer is selected from hydrofluorocarbons, hydrofluoroolefins, hydrochlorocarbons, hydrochloroolefins, hydrochlorofluorocarbons, hydrochlorofluoroolefins, hydrochlorocarbons, hydrochloroolefins, chlorofluorocarbons, chlorofluoroolefins, hydrocarbons, perfluorocarbons, perfluoroolefins, and combinations thereof.

12. The composition of claim 11, wherein said tracer is selected from HFC-23, HCFC-31, HFC-41, HFC-161, HFC-152a, HFC-143a, HFC-125, HFC-227ca, HFC-227ea, HFC-236fa, HFC-236cb, HFC-236ea, HFC-245cb, HFC-245fa, HFC-245eb, HFC-254eb, HFC-263fb, HFC-272ca, HFC-281ea, HFC-281fa, HFC-329p, HFC-329mmz, HFC338mf, HFC-338pcc, CFC-12, CFC-11, CFC-114, CFC-114a, HCFC-22, HCFC-123, HCFC-124, HCFC-124a, HCFC-141b, HCFC-142b, HCFC-151a, HCFC-244bb, HCC-40, HFO-1141, HCFO-1130, HCFO-1130a, HCFO-1131, HCFO-1122, HFO-1123, HFO-1234ye, HFO-1243zf, HFO-1225yeZ, HFO-1225zc, PFC-116, PFC-C216, PFC-218, PFC-C318, PFC-1216, PFC-31-10mc, PFC-31-10my, and combinations thereof.

13. A process for producing cooling comprising evaporating the composition of claim 1 in the vicinity of a body to be cooled and thereafter condensing said composition.

14. A process for producing heating comprising condensing the composition of claim 1 in the vicinity of a body to be heated and thereafter evaporating said composition.

15. A system for cooling comprising an evaporator, compressor, condenser, and expansion device, said system containing the composition of claim 1.

16. The system of claim 15, which is a chiller.

17. A system for heating comprising an evaporator, compressor, condenser, and expansion device, said system containing the composition of claim 1.

18. The system of claim 17, which is a heat pump.

19. A method for replacing HFO-1234zeE in a system for cooling or heating comprising providing the composition of claim 1 to said system.

20. The method of claim 19, wherein the system for cooling or heating is a chiller or a heat pump.

21. A method for replacing HFO-1234zeE or R-515A or R-515B in a system for cooling or heating comprising providing the composition of claim 1 to said system, wherein the system comprises a centrifugal compressor.

22. A composition comprising a refrigerant consisting essentially of about 26 weight percent HFO-1225yeE, about 62 weight percent HFO-1234zeE, and about 12 weight percent HFC-134.

* * * * *